Figure 1:
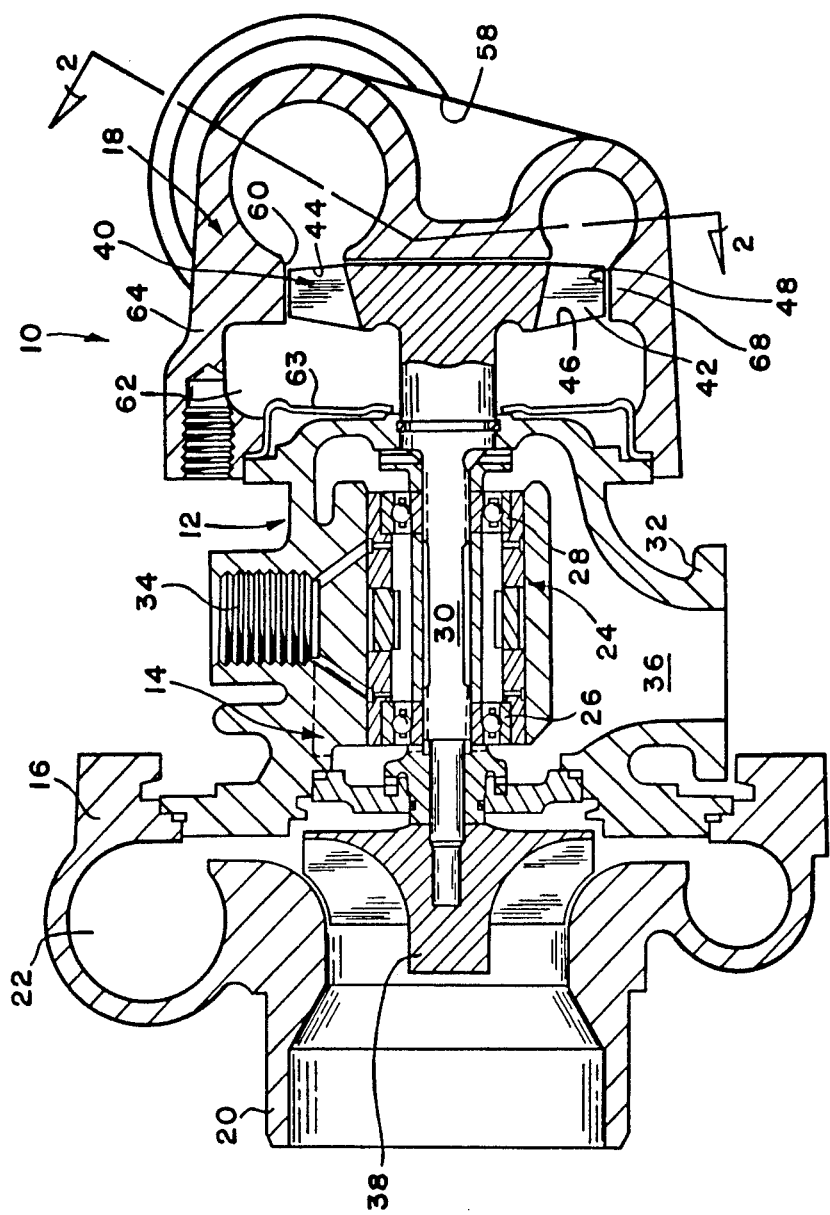

United States Patent [19]

Gutknecht

[11] Patent Number: 4,850,820
[45] Date of Patent: Jul. 25, 1989

[54] EXHAUST GAS DRIVEN TURBOCHARGER

[75] Inventor: Daniel A. Gutknecht, Torrance, Calif.

[73] Assignee: Allied-Signal Inc., Morristown, N.J.

[21] Appl. No.: 194,768

[22] Filed: May 17, 1988

[51] Int. Cl.$^4$ ............................................. F04B 35/00
[52] U.S. Cl. .................................................. 417/407
[58] Field of Search ............... 417/405, 406, 407, 408, 417/409

[56] References Cited

U.S. PATENT DOCUMENTS

| 4,149,832 | 4/1979 | Sivolap et al. | 417/409 |
| 4,184,812 | 1/1980 | Nomura et al. | 417/409 |
| 4,196,593 | 4/1980 | Froeliger | 417/409 |

*Primary Examiner*—Louis J. Casaregola
*Assistant Examiner*—Timothy S. Thorpe

*Attorney, Agent, or Firm*—Ken C. Decker; William N. Antonis

[57] ABSTRACT

An exhaust gas driven turbocharger includes a shaft rotatably mounted in a housing by a bearing assembly. A compressor wheel and a turbine wheel are mounted on opposite ends of the shaft. Exhaust gasses are directed to the upstream side of the turbine wheel by an inlet scroll defined between one end of the housing and the turbine wheel. A collector chamber is defined between the downstream side of the turbine wheel and the portion of the housing within which the bearings are mounted. Accordingly, the relatively cooler exhaust gasses on the downstream side of the turbocharger are adjacent the bearings, thereby minimizing heat transfer unto the bearings. Flow through the turbine wheel is in substantially an axial direction.

3 Claims, 2 Drawing Sheets

EXHAUST GAS DRIVEN TURBOCHARGER

This invention relates to an exhaust gas turbocharger which uses engine exhaust gases to drive a turbine wheel which rotates a compressor wheel. The compressor wheel compresses ambient air to increase the pressure level in the engine induction system.

Automotive turbochargers include a compressor wheel and a turbine wheel mounted on opposite ends of a shaft supported in a bearing housing. Exhaust gases are ducted through the turbine wheel to turn the shaft and thereby operate the compressor wheel. Most automotive exhaust gas driven turbochargers have heretofore directed the exhaust gas radially against the turbine blades mounted on the turbine wheel and then directed the exhaust gasses from the housing in a direction substantially parallel to the axis of the shaft.

The present invention provides a turbocharger in which gasses are directed through the turbine wheel in a generally axial direction, and has many advantages over such prior art turbochargers. An axial flow turbine inherently has a lower moment of inertia than does a radial flow turbine, thus reducing the amount of energy required to accelerate the turbine to operating speed. Furthermore, the present invention channels the flow of exhaust gasses radially inward, and then turns the exhaust gasses axially through the turbine blades into a collector chamber between the turbine wheel and the portion of the housing which supports the bearings. Accordingly, the exhaust gas, which has been cooled because some of the thermal energy of the exhaust gas has been changed into kinetic energy necessary to rotate the shaft by passing the exhaust gas through the turbine blades, is ducted into a collection chamber next to the bearing housing. Therefore, heat transfer into the bearings is reduced as compared to prior art turbochargers, thereby increasing the life of the bearings.

Furthermore, according to the present invention, the outlet connection with the collector chamber can be placed at any desired location about the housing. Accordingly, the turbocharger can be designed so that it requires substantially less volume than existing automotive turbochargers, thereby permitting it to be installed on engines where existing turbochargers cannot be used because of lack of space. Furthermore, the flexibility in positioning the outlet connection, depending upon the engine upon which the turbocharger is used, may permit the elimination of components (such as elbows) in the exhaust ducting that are required with existing turbocharger in which the discharge of the exhaust gasses is along the axis of the turbocharger.

Figure 2:
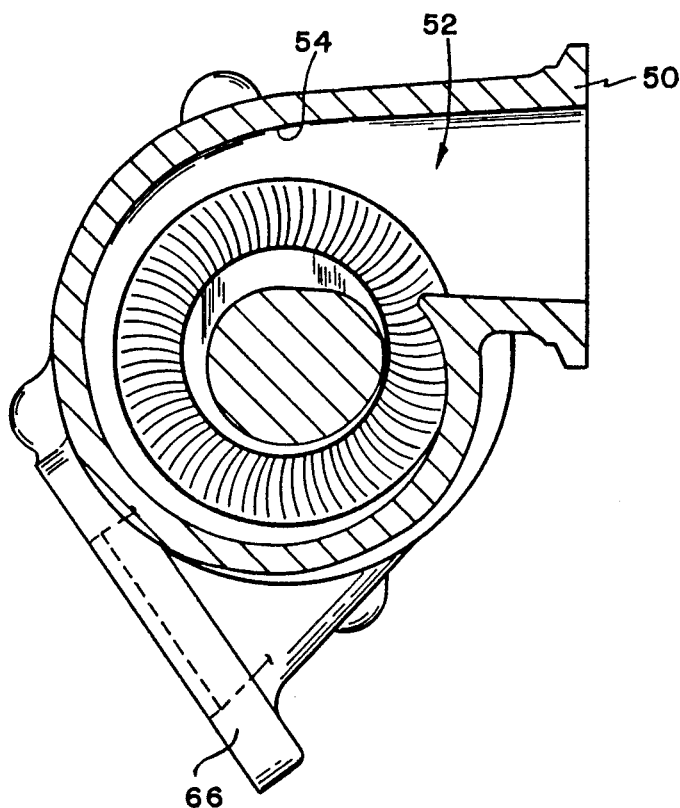

These and other advantages of the present invention will become apparent from the following description, with reference to the accompanying drawings, in which:

FIG. 1 is a longitudinal cross-sectional view of an exhaust driven turbocharger made pursuant to the teachings of the present invention; and FIG. 2 is a view taken substantially along lines 2—2 of FIG. 1.

Referring now to the drawings, an exhaust gas driven turbocharger for an automotive vehicle is generally indicated by the numeral 10 and includes a housing 12 having a bearing support section 14, a compressor section 16, and a turbine section 18. The compressor section 16 includes an ambient air inlet 20 which communicates ambient air into the section 16 of the housing 12, and an outlet chamber 22 which is communicate to the intake manifold (not shown) of the engine upon which the turbocharger 10 is installed.

A bearing assembly generally indicated by the numeral 24 is mounted within the bearing support section 14 of housing 12 and includes a pair of axially spaced roller bearings 26, 28 which rotatably support a shaft 30. The bearing assembly 24 is conventional and will not be described in detail herein. The bearing support portion of housing 12 includes oil inlet passage 34 for communicating lubricating oil to the bearings of bearing assembly 24 and a mounting flange 32 for connecting oil reservoir 36 to the vehicle engine. Lubricating oil is pumped through the bearing assembly 24 for cooling and lubricating the bearings 26, 28.

A compressor wheel 38 is mounted on one end of the shaft 30 which extends into the compressor section 16 of the housing 12 is turned by the shaft 30 to compress the air drawn in through the ambient air inlet 20. The shaft 30 is rotated by passing exhaust gasses through a turbine wheel generally indicated by the numeral 40 which is mounted on the opposite end of the shaft 30 in the turbine section 18 of the housing 12. The turbine wheel 40 includes circumferentially spaced, generally radially projecting turbine blades 42 which are defined by an upstream edge 44, a downstream edge 46, and a connecting edge 48. Turbine section 18 further includes an exhaust gas inlet 50 which is radially offset from the axis of the shaft 30, and a flow directing inlet scroll generally indicated by the numeral 52 which includes a duct 54 which directs flow of exhaust gasses generally inwardly from the inlet 50 to the upstream edges 44 of the turbine blades 42. The duct 54 has a gradually decreasing area or aspect ratio (A/R) which is greatest at the inlet 50 and decreases to zero cross-sectional area where the tail of the scroll reattaches to the inlet portion of the scroll shaped conduit 54. The scroll-shaped duct 54 is defined between the end wall 58 of the housing 12 and the turbine wheel 40. A transition section 60 of the duct 54 directs the radially flowing gasses in the duct 54 in a direction generally parallel to the axis of the shaft 30 so that the exhaust gas impacts upon the leading edge 44 of the turbine blades 40 from a generally axially direction.

The exhaust gas is discharged from the turbine wheel 40 into a collector chamber 62 which is defined between the downstream edges 46 of the turbine blades 40 and a shroud 63 carried by the housing 12. Although shown as a plenum chamber, the collector chamber 62 may also be a scrolling collector duct which scrolls in the opposite way from the duct 54 so that the smaller portion of the duct will be axially offset from the larger portion of the duct 54 and the lager portion of the collecting duct will be offset from the smaller area portion of the inlet duct 54. In this way, a smaller overall package may be achieved. Because the collecting chamber 62 is located between the downstream edges 46 of the turbine blades 40 and the shroud 63 of housing 12, the relatively cooler gasses in the collector chamber 62 are adjacent the portion of the housing in which the bearings assembly 24 is mounted. Accordingly, the cooler discharged exhaust gasses in chamber 62, because of their lower temperature, reduce the amount of heat that would normally be transferred to the bearings in comparison with prior art turbochargers in which the relatively hot inlet exhaust gasses are ducted adjacent the portion of the housing supporting the bearings. Accordingly, the life of the bearings may be increased.

The turbine section 18 in housing 12 includes a circumferentially extending wall 64 which defines the collector chamber 62. An exhaust gas outlet 66 is mounted on the wall 64, to communicate exhaust gasses from the chamber 62. It will be noted that, because the collector chamber 62 is defined by the circumferentially extending wall 64, the outlet 66 may be located virtually anywhere on the wall 64, so that the outlet 66 may be placed where it is most convenient with respect to the rest of the vehicle exhaust system, thereby further reducing the under hood space required by the turbocharger 10; and also eliminating at least one of the elbows needed in prior art turbochargers. The turbine section 18 further includes a connecting section 68 which interconnects the circumferential wall 64 with the scroll 52. Accordingly, it will be noted that the collector chamber 62 is offset axially with respect to the shaft 30 on one side of the turbine wheel 40 and that the inlet scroll 52 is offset axially with respect to the turbine wheel 40 on the opposite side of the turbine wheel 40. In operation, the relatively hot exhaust gasses communicated into the scroll 52 release some of their energy in passing through the turbine blades 40 to impart rotation to the turbine wheel 40, and are then gathered in the collector chamber 62. Because some of the energy of the exhaust gasses has been changed from thermal energy to the kinetic energy necessary to rotate the turbine wheel, the exhaust gasses in the collector chamber 62 will be relatively cooler than the exhaust gasses entering the turbine blades at their upstream side. Accordingly, since the gasses in chamber 62 are cooler, they are cannot transfer as much thermal energy to the bearings through the wall of the housing 12.

The arrangement described positions the turbine wheel 40 including all portions of the leading edges 44 and the trailing edges 46 of turbine header 40 radially within the connecting section 68, which is relatively thick since it is defined between exhaust gas inlet passage 52 and the chamber 62. In the event of failure of the turbine wheel 40, a fractional piece or pieces of the turbine wheel 40 will be stopped by the connecting section 68, assuring product safety without increasing the thickness of the outside walls 64 and 58, as is necessary in turbochargers of existing design.

I claim:

1. An exhaust gas driven turbocharger comprising a housing, a shaft mounted in said housing, bearing means for rotatably supporting said shaft in said housing, said housing including a bearing support section supporting said bearings and said shaft, said bearing support section including opposite end walls, said shaft extending through said end walls, a compressor wheel mounted on one end of the shaft, and a turbine wheel mounted on the other end of the shaft, said housing including ambient air inlet and outlet means for communicating ambient air to said compressor wheel and for communicating compressed air from said compressor wheel, said housing further including exhaust gas inlet means for communicating exhaust gas to said turbine wheel and exhaust gas outlet means for communicating exhaust gas from said turbine wheel, said turbine wheel including a hub and axial flow turbine blades projecting radially from said hub, said turbine blades having an upstream edge and a downstream edge, said exhaust gas inlet means including an inlet portion radially offset from the axis of the shaft and a scroll-shaped member defining a conduit extending circumferentially about said housing and tapering radially inwardly toward said turbine wheel to direct exhaust gassed radially inwardly toward said turbine wheel, said conduit having a continually decreasing area in the direction of flow which is greatest at the inlet and decreases to a minimum cross-sectional area where the tail of the scroll reattaches to the inlet portion, said inlet and said conduit being defined in a plane transverse with respect to said shaft and offset axially from said hub and said turbine blades, circumferentially extending flow directing means for turning the flow of exhaust gas from the conduit to a direction generally parallel to the axis of the shaft and into the upstream edge of the turbine blades so that the exhaust gas impacts on said upstream edge of the turbine blades from a direction generally parallel to the axis of rotation of the shaft, said exhaust gas outlet means including a collector chamber defined between the downstream edges of said turbine blades and the corresponding end wall of the bearing support section, said collector chamber being defined by a wall extending circumferentially about said shaft, and means for directing exhaust gas from the collector chamber to the exterior of the housing in a direction other than a direction substantially parallel to the axis of rotation of the shaft.

2. Exhaust gas driven turbocharger as claimed in claim 1, wherein the means for directing exhaust gas from the collector chamber is an opening in said wall extending circumferentially about said shaft.

3. Exhaust gas driven turbocharger as claimed in claim 1, wherein the conduit decreases to zero cross-sectional area where the tail of the scroll reattaches to the inlet portion.

* * * * *